United States Patent [19]

Hasegawa et al.

[11] Patent Number: 5,017,961
[45] Date of Patent: May 21, 1991

[54] IMAGE FORMING APPARATUS WITH USE OF A LASER BEAM

[75] Inventors: Hirofumi Hasegawa; Naoto Ohmori; Yukio Yamada; Narutaka Yoshida, all of Osaka, Japan

[73] Assignee: Minolta Camera Kabushiki Kaisha, Osaka, Japan

[21] Appl. No.: 374,289

[22] Filed: Jun. 29, 1989

[30] Foreign Application Priority Data

Jun. 29, 1988 [JP] Japan .................. 63-162209
Aug. 23, 1988 [JP] Japan .................. 63-210166
Aug. 23, 1988 [JP] Japan .................. 63-210167

[51] Int. Cl.$^5$ .................. G03G 21/00; H04N 1/23
[52] U.S. Cl. .................. 355/202; 346/153.1; 355/228; 355/229; 355/231; 355/233; 358/296; 358/300
[58] Field of Search .................. 355/228, 229, 230, 231, 355/232, 233, 234, 235, 238, 202, 75, 76; 346/160, 153.1; 358/296, 300, 302

[56] References Cited

U.S. PATENT DOCUMENTS 3,966,319 6/1976 Lang .
4,012,585 3/1977 Chen .
4,268,159 5/1981 Tashiro .................. 355/238 X
4,397,537 8/1983 Tamura .................. 355/202

FOREIGN PATENT DOCUMENTS 54-25736 2/1979 Japan .
54-130137 10/1979 Japan .
0019071 2/1981 Japan .................. 355/233
0022461 3/1981 Japan .................. 355/233
56-23953 3/1981 Japan .
0074760 5/1982 Japan .................. 355/202
61-19033 5/1986 Japan .

Primary Examiner—A. T. Grimley
Assistant Examiner—Matthew S. Smith
Attorney, Agent, or Firm—Price, Gess & Ubell

[57] ABSTRACT

An image forming apparatus includes a laser beam radiating unit utilized as a light source, and an optical system that the surface of an original reflects a laser beam radiated from the radiating unit to project an image reflected from the original onto a photosensitive member. In this apparatus, an image is formed selectively in a print mode that an image results from turning on and off the laser beam, in a copy mode that a copy of an original results from exposure of the photosensitive member to the laser beam reflected from the surface of an original or in a composite mode that a composite image is formed of a copy of an original and an image resulting from turning on and off the laser beam. Also, this apparatus comprises a reflector for directing the laser beam to the photosensitive member, and the reflector is automatically set at the reflecting position when the original cover is open or the print mode is selected. Further, this apparatus comprises a lock system for locking an original cover; the lock system works to lock the original cover when the copy mode or the composite mode is selected and to unlock the cover when the print mode is selected.

16 Claims, 11 Drawing Sheets

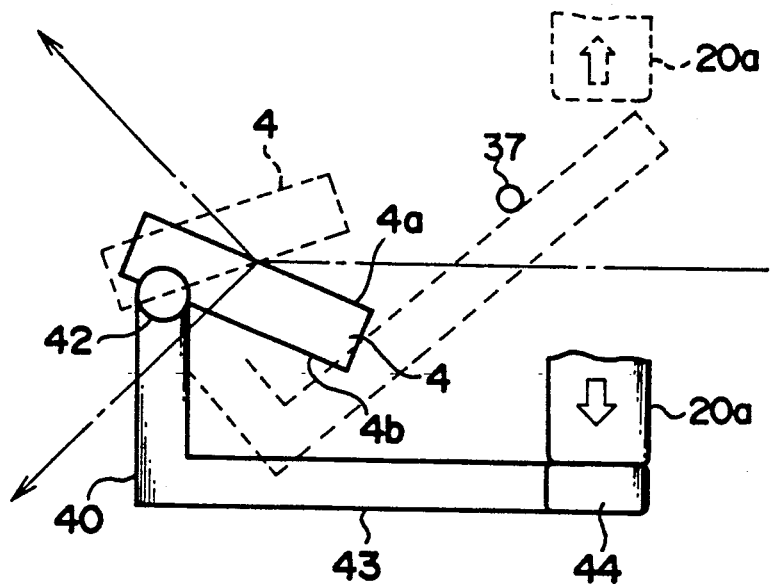
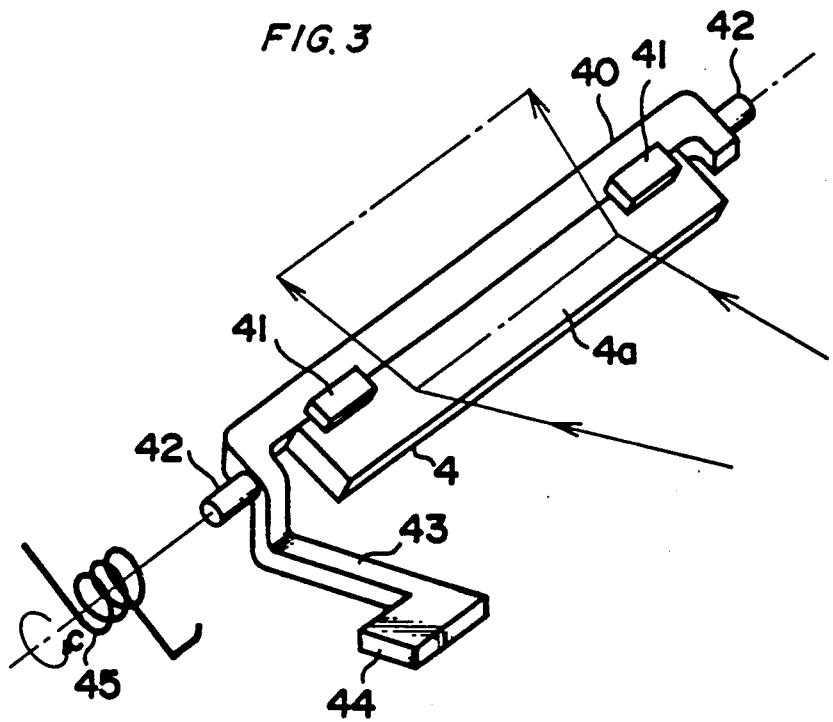

IMAGE FORMING APPARATUS WITH USE OF A LASER BEAM

BACKGROUND OF THE INVENTION

1. Field of the Invention

The present invention relates to an image forming apparatus, and more specifically, an image forming apparatus wherein a photosensitive member charged with a specified potential beforehand is exposed to a laser beam responding to image data so that an electrostatic latent image is formed on the photosensitive member, and then the latent image becomes visible on a sheet of paper.

2. Description of Related Art

Generally, regarding an image forming apparatus wherein an electrostatic latent image on a photosensitive member is caused by exposure to light with image data, and then the latent image appears on a paper sheet, an electrophotographic copier wherein a copy of an original results from reflection and a laser printer wherein a laser beam is turned on and off in accordance with image data are known. These apparatuses are different from each other only in measure of exposure, and the other elements of an image forming section except a light source can be commonly used in the apparatuses.

Therefore, Japanese Laid Open Patent Publication No. 54-25736 suggests an image forming apparatus for which exposure means utilizing the reflection of an original and exposure means utilizing a modulated laser beam are both provided, wherein the other image forming elements are commonly used. This arrangement enables an image to be formed selectively by the reflected light from an original or the modulated laser beam.

In this apparatus, however, it is impossible to form a composite image by using both the reflected light from an original and the laser beam simultaneously. For, in this apparatus, the light to be reflected by the surface of an original and the laser beam are emitted from different light sources, and their optical paths are different except for the last portion of them.

SUMMARY OF THE INVENTION

It is, therefore, an object of the present invention to provide an image forming apparatus wherein not only the reproduction of an original and the image forming with use of a modulated laser beam can be separately performed but also a composite image of them can be formed.

Another object of the present invention is to provide an image forming apparatus wherein leakage of a laser beam caused by an opening action of an original cover is surely prevented, and the measure does not affect a latent image which has been formed on a photosensitive member with a laser beam.

Another object of the present invention is to provide an image forming apparatus wherein during operation in a print mode an image results from turning on and off a laser beam, and the laser beam is prevented from scattering in order to improve the reproduction of dots.

To attain the above-mentioned objects, an image forming apparatus according to the present invention is an apparatus wherein an electrostatic latent image is formed on a photosensitive member charged with specified potential, the photosensitive member being exposed to light from a light source, and the latent image is developed and then transferred onto a sheet of paper, said image forming apparatus comprising laser beam radiating means; optical means for guiding the laser beam radiated from the laser beam radiating means to an original glass and for projecting an image reflected from an original onto the photosensitive member. Accordingly, when the laser beam radiating means is kept on so that the surface of the original keeps on reflecting the laser beam, the image of the original is projected onto the photosensitive member, thereby reproducing the image of the original. Also, when the laser radiating means is turned on and off to radiate the laser beam in accordance with image data with the reflecting surface white, an image is formed only in response to turning on and off the laser beam. Further, when an original is set on the original glass, and at the same time the laser beam radiating means is turned on and off in accordance with image data, a composite image is formed of a copy of the original and an image resulting from turning on and off the laser beam.

The image forming apparatus according to the present invention, further, comprises not only the above-described components but also reflecting means for guiding the laser beam radiated from the laser beam radiating means to the photosensitive member, and drive means for driving the reflecting means to direct the laser beam to the photosensitive member when an original cover is open. Thus, the reproduction of an original and the image forming by turning on and off the laser beam can be performed separately, and also these two types of image forming can be performed at the same time to make a composite image. Also, when the original cover is pulled open carelessly, the drive means drives the reflecting means in connection with the opening action of the cover. Thereby, the laser beam never irradiates the original glass but is directed to the photosensitive member to continue the formation of a latent image.

An image forming apparatus according to the present invention, furthermore, comprises mode selection means for selecting a print mode so that an image results from turning on and off the laser beam, a copy mode wherein a copy of an original results from exposure of the photosensitive member to the laser beam reflected from the surface of an original or a composite mode so that a composite image is formed of a copy of an original and an image resulting from turning on and off the laser beam; and drive means for driving the reflecting means to direct the laser beam to the photosensitive member when the print mode is selected. In the image forming apparatus, each of the image forming modes can be selected by selecting means, e.g., each of them is selected by turning on a corresponding selection switch provided for a control panel. When the print mode is selected, the reflecting means is set at a position to direct the laser beam to the photosensItive member. Thereby, while the apparatus is operated in the print mode, the laser beam is prevented from scattering on the original glass, the reproduction of dots is improved, and a fear of exposure of an operator is eliminated, allowing the original cover to be open and closed freely.

The image forming apparatus according to the present invention, furthermore, comprises not only the above-described components but also lock means for locking the original cover; and drive means for driving the lock means to lock the original cover when the copy mode or the composite mode is selected and to unlock the original cover when the print mode is selected. Accordingly, during operation in the copy mode or the composite mode wherein the original glass is exposed to the laser beam, the lock means is driven to keep the original cover locked. Thereby, the original cover can not be open, and the fear of exposure of an operator to the laser beam is certainly eliminated. On the other hand, when the print mode is selected, the reflecting means is positioned to direct the laser beam to the photosensitive member, and the original cover is unlocked, thereby allowing an operator to set an original on the original glass with no fear of exposure to the laser beam.

BRIEF DESCRIPTION OF THE DRAWINGS

These and other objects and features of the present invention will become apparent from the following description taken in conjunction with the preferred embodiments thereof with reference to the accompanying drawings.

FIGS. 1 through 6 show a first embodiment of an image forming apparatus according to the present invention;

FIG. 1 is a schematic view of the image forming apparatus showing its general constitution;

FIG. 2 is an explanatory view of the deflection of a light path;

FIG. 3 is a perspective view around a mirror holder;

FIG. 4 is a sketch drawing of the image forming apparatus;

FIG. 6 is a drawing explaining the relations among the surface of an original, an output from a laser diode and a latent image;

FIGS. 7 through 15 show a second embodiment of an image forming apparatus according to the present invention;

FIG. 7 is an explanatory view of the deflection of a light path;

FIG. 8 is a perspective view around a mirror holder and drive means;

FIG. 9 is a perspective view of a principal part of an original cover;

FIG. 12 is a perspective view of a whole apparatus;

FIG. 13 is a block diagram showing a control circuitry;

FIG. 14 is a flowchart showing an example of a control procedure; and

FIG. 15 is a flowchart showing another example of the control procedure.

DESCRIPTION OF THE PREFERRED EMBODIMENTS

Preferred embodiments of an image forming apparatus according to the present invention are described below in reference to the accompanying drawings. Further, the same numerals are given to the same parts and members in all the drawings.

[First Embodiment: Refer to FIGS. 1 through 6]

Figure 1:
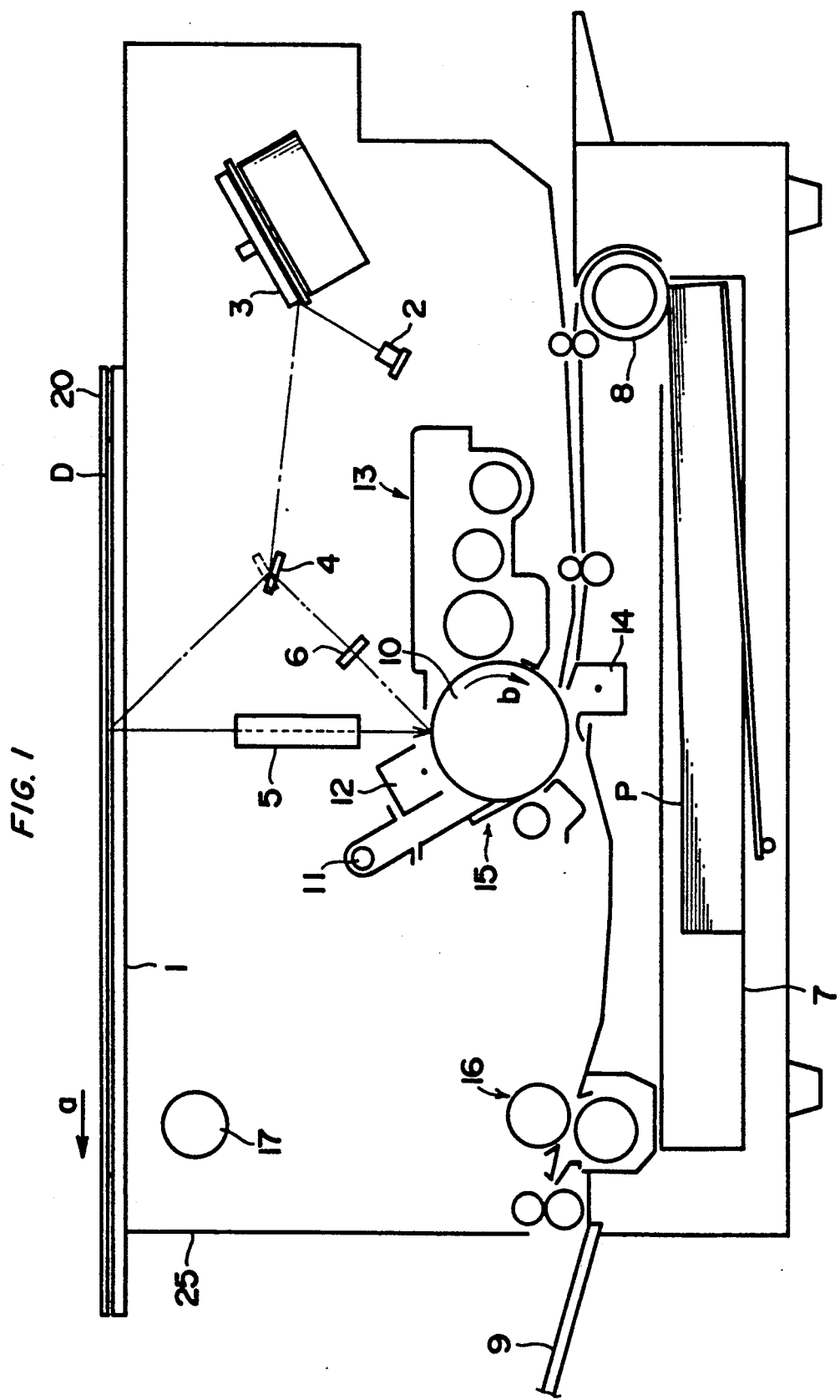

Numeral 1 in FIG. 1 is an original glass which can slide by the rotation of a motor 17 in the direction of the arrow a on a body 25 of an apparatus, and FIG. 1 shows a state that the original glass 1 is sliding. Numeral 2 is a laser diode. Numeral 3 is a polygon mirror enabling a laser beam to scan. Numeral 4 is a mirror. Numeral 5 is a lens array equipped with optical fiber. A laser beam emitted from the laser diode 2 irradiates each surface of the polygon mirror 3, and the reflected light irradiates the mirror 4, thereby being directed to an original D or the reverse side of an original cover 20 to scan the surface. Then, the surface of a photosensitive drum 10 is exposed to the reflected light through the lens array 5. The laser diode 2 is controlled to be turned on and off by a drive circuit in accordance with an image signal produced from an image control device. The polygon mirror 3 is driven to rotate at a specified frequency. Such a control system of the image signal is so well-known that the detailed description is omitted.

The photosensitive drum 10 can be driven to rotate in the direction of the arrow b, and around the drum 10, an eraser lamp 11 for erasing residual charge, an electric charger 12, a developing device 13 having a magnetic brush, a transferring charger 14, a cleaning device 15 for removing residual toner with a blade, etc. are arranged. Copying paper P is fed sheet by sheet from a feeding cassette 7 which is removable and disposed at the lower part of the body 25 of the apparatus. A sheet fed from the cassette 7 makes a U-turn around a feeding roller 8, and when the sheet passes between the transfer charger 14 and the photosensitive drum 10, a toner image is transferred thereon. Thereafter, the sheet is transported to the left, and the toner image is fixed thereon by heat at a fixing device 16. Then, the sheet is discharged onto a tray 9.

The mirror 4 whose both sides 4a and 4b are reflecting surfaces is, as shown in FIGS. 2 and 3, nipped and supported by clicks 41 disposed on the upper and lower surfaces of a holder 40, and the mirror 4 and the holder 40 can be turned on shafts 42 in a body. The mirror 4 can be turned to a first position (the position shown by solid lines in FIGS. 1 and 2) where the front side 4a of the mirror 4 reflects the laser beam to direct the laser beam to the surface of an original on the original glass 1 and a second position (the position shown by dashed lines in FIGS. 1 and 2) where the reverse side 4b of the mirror 4 reflects the laser beam to project an image onto the photosensitive drum 10.

Figure 4:
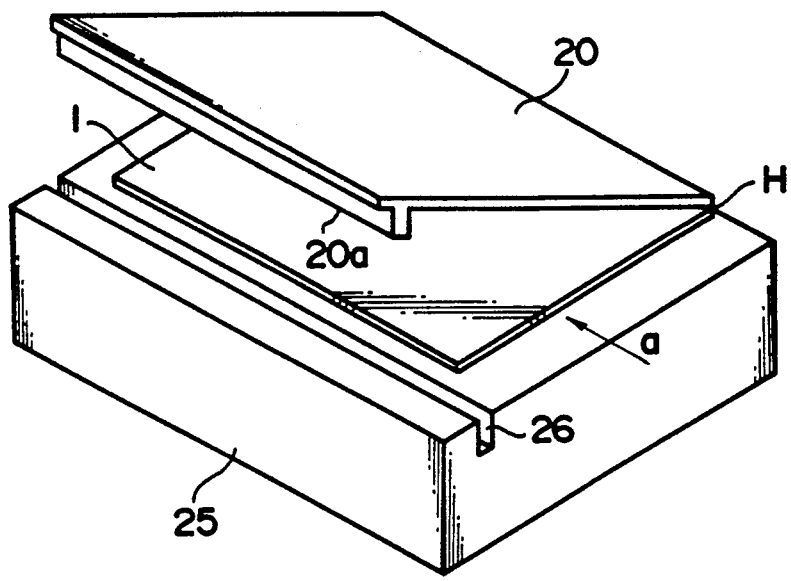

Specifically, the holder 40 is urged in the direction of the arrow c in FIG. 3 by a coil spring 45 twisted around one of the shafts 42. A tab 44 provided for an arm 43 of the holder 40 is in contact with a projection 20a of the original cover 20, thereby keeping the mirror 4 at the first position. As shown in FIG. 4, the original cover 20 is movable together with the original glass 1, and it also can pivot on a point H located on the back side of the body 25 so as to cover and uncover the original glass 1. When the original cover 20 covers the original glass 1, the projection 20a comes into the body 25 through a groove 26 formed on the body 25, and the mirror 4 is set at the first position (refer to FIG. 5a). The projection 20a is long enough to keep on pushing the tab 44 during the motion of the original cover 20 and the original glass 1 for a scan of an original, so that the mirror 4 is kept at the first position all the time.

Figure 5A:
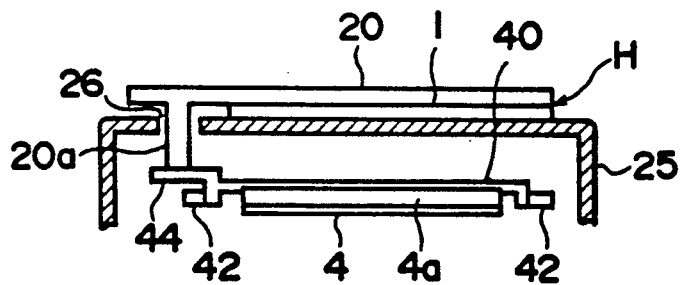
FIGS. 5a and 5b are cross sectional views showing a motion of a mirror.
Figure 5B:
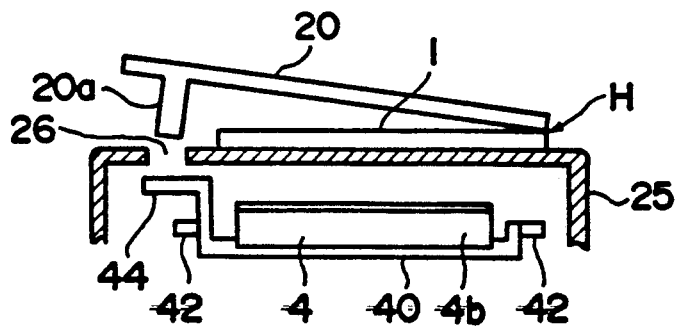

When the original cover 20 is pulled up to an open position, the mirror 4 is turned in the direction of the arrow c together with the holder 40 by the elasticity of the spring 45, and the arm 43 comes into contact with a stopper pin 37 fixed on a frame not shown in the drawings, thereby setting the mirror 4 at the second position (refer to FIG. 5b). At this moment, the laser beam is reflected on the reverse side 4b of the mirror 4, and the reflected light irradiates the same point on the photosensitive drum 10 as the reflected light from the surface of the original. Further, in the middle of a light path from the mirror 4 to the photosensitive drum 10, an extinction filter 6 is arranged. This is arranged for the purpose of decaying the laser beam from the reverse side 4b of the mirror 4 so that the quantity of light can be adjusted to the same quantity as that of the reflected light from the surface of the original.

The process of forming an image on a sheet of copying paper in the above-described constitution is hereinafter described. In this case, the original cover 20 is closed, and the mirror 4 is kept at the first position.

Figure 6:
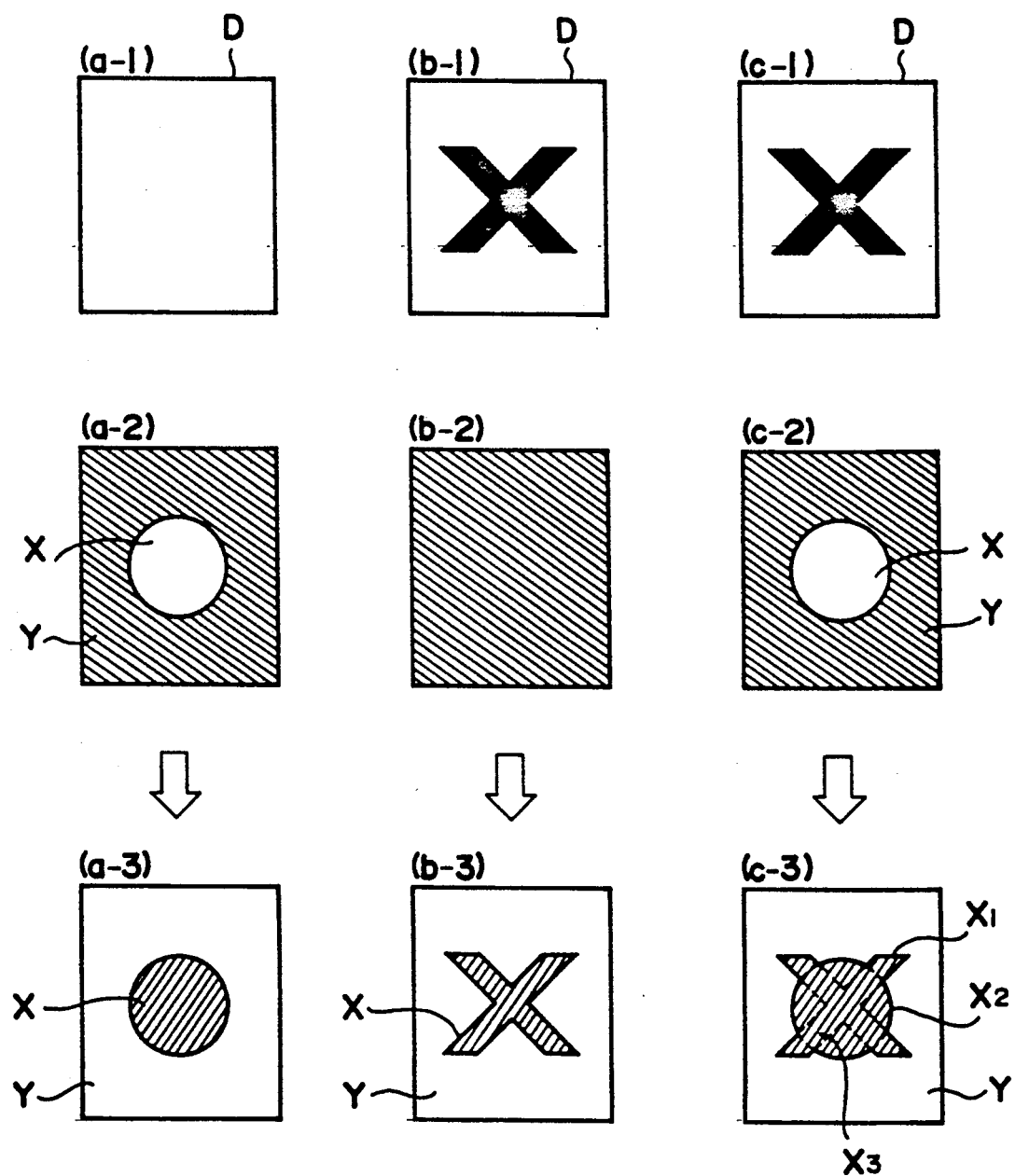

First, in a case of printing an image with the modulated laser beam, as shown by FIG. 6, (a-1), a white blank sheet D should be placed on the original glass 1 as a reflecting surface, or the reverse side of the original cover 20 should be used as a reflecting surface, and then image data is output from the laser diode 2. For example, referring to FIG. 6, (a-2), the laser diode 2 is kept off while an imaged portion X in the shape of a circle is scanned, and the laser diode 2 is kept on while a background Y shown by oblique lines in the drawing is scanned. Thereby, as shown by FIG. 6, (a-3), an electrostatic latent image is formed on the photosensitive drum 10 of the imaged portion X maintaining electric charge and the background Y where electric charge was erased.

Also, in order to print out a copy of an original, the original should be placed on the original glass 1, the laser diode 2 should be kept on all the time, and the original glass 1 should be moved at a specified speed. For example, when the laser diode 2 keeps on emitting the laser beam [FIG. 6, (b-2)] to an original D as shown by FIG. 6, (b-1), an electrostatic latent image is formed on the photosensitive drum 10 of an imaged portion X maintaining electric charge and a background Y where electric charge was erased, as shown by FIG. 6, (b-3).

Further, in a case of printing out a composite image of a copy of an original and an image resulting from turning on and off the laser beam, an original D should be placed on the original glass 1 to be moved at a specified speed, and at the same time the laser diode 2 should be turned on and off to output image data. For example, the laser diode 2 radiates the laser beam to an original D as shown by FIG. 6, (c-1), being off while an imaged portion X in the shape of a circle shown by FIG. 6, (c-2) is scanned and being on while a background Y as shown by oblique lines in the drawing is scanned. Thereby, a composite electrostatic latent image is formed of two images as shown by FIG. 6, (c-3). In this case, the portion shown by X1, which was exposed to the laser beam, remains charged because it corresponds to an imaged portion of the original D. The portion shown by X2, which corresponds to a background of the original D, remains charged because it was not exposed to the laser beam. The portion shown by X3 remains charged because it corresponds to an imaged portion of the original D and was not exposed to the laser beam. In the other portion Y, the charge is erased, and the portion Y becomes a background.

The diameter of the laser beam which irradiates the surface of an original needs to be narrowed enough in order to reproduce the image of an original well. Unless the diameter of the laser beam is narrow enough, the laser beam will be apt to irradiate both white and black portions of an original at a time, and the scattering coefficient of the reflection on the surface of the original will be large, resulting in poor image reproduction.

Also, when the laser beam reflected from the reverse side 4b of the mirror 4 is projected onto the photosensitive drum 10, the diameter of the beam needs to be enough narrowed.

If the original cover 20 is pulled up open while the laser beam scans an original, the mirror 4 is moved to the second position, so that the laser beam is not directed to the original glass 1 but to the photosensitive drum 10. Thereby, the laser beam is prevented from leaking out of the body. Even if it happens in the middle of a printing operation by the laser beam, image data is transmitted and projected onto the photosensitive drum 10 by a reflected light from the reverse side 4b of the mirror 4, the quantity of light being adjusted by the filter 6. Thus, the formation of a latent image is continued with no trouble, and an image is formed on a paper sheet.

On the other hand, in the first embodiment, as means for setting the mirror 4 at the first position and the second position, a combination of a sensor for detecting opening and closing actions of the original cover 20 with a pulse motor for turning the mirror 4 in accordance with an opening or a closing signal produced by the sensor can be utilized. Also, the mirror 4 may be so constituted to reflect the laser beam on one side whether it is set at the first position or the second position. Further, it is possible that two mirrors, which correspond to the first and the second positions respectively and diverted alternately, are used as reflecting members for deflecting the light path. Furthermore, as a means of scanning the image of an original, a moving original glass type has been adopted, but the optical system can be so made to be movable instead.

[Second Embodiment: Refer to FIGS. 7 through 15]

An image forming apparatus of a second embodiment has the same constitution as that of the first embodiment, wherein an image is formed with a laser beam. In addition, the apparatus comprises lock means 30 for preventing the original cover 20 from opening during the irradiation of an original.

In this second embodiment, the image forming apparatus comprises basically the same devices and members as shown in FIG. 1, that is, the original glass 1, the laser diode 2, the polygon mirror 3, the mirror 4, the photosensitive drum 10, the electric charger 12, the developing device 13, etc.

Figure 7:
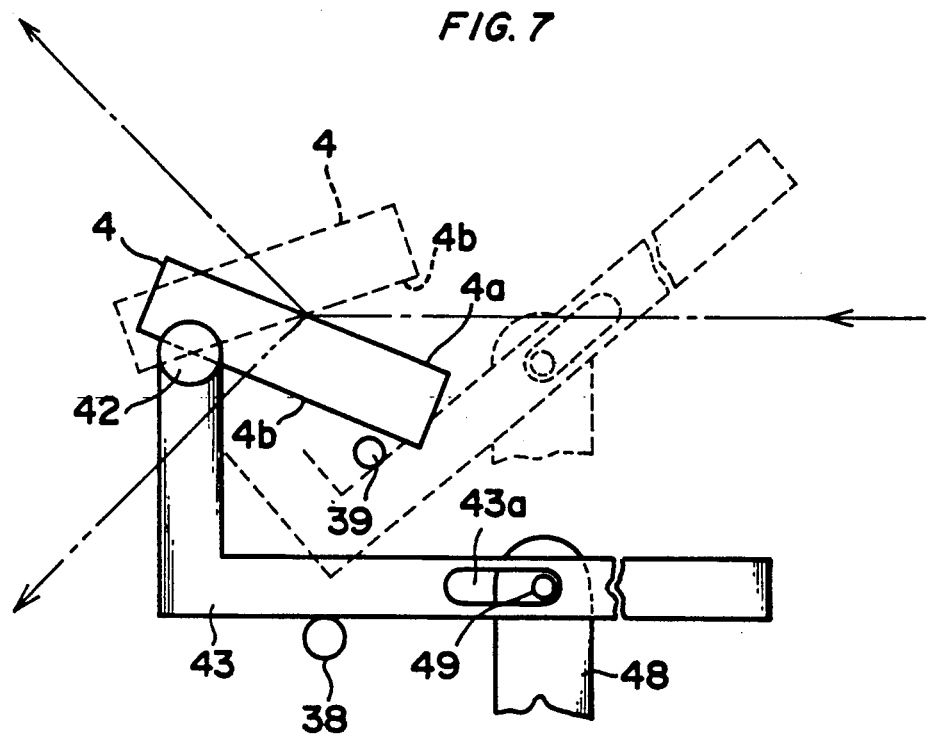
Figure 8:
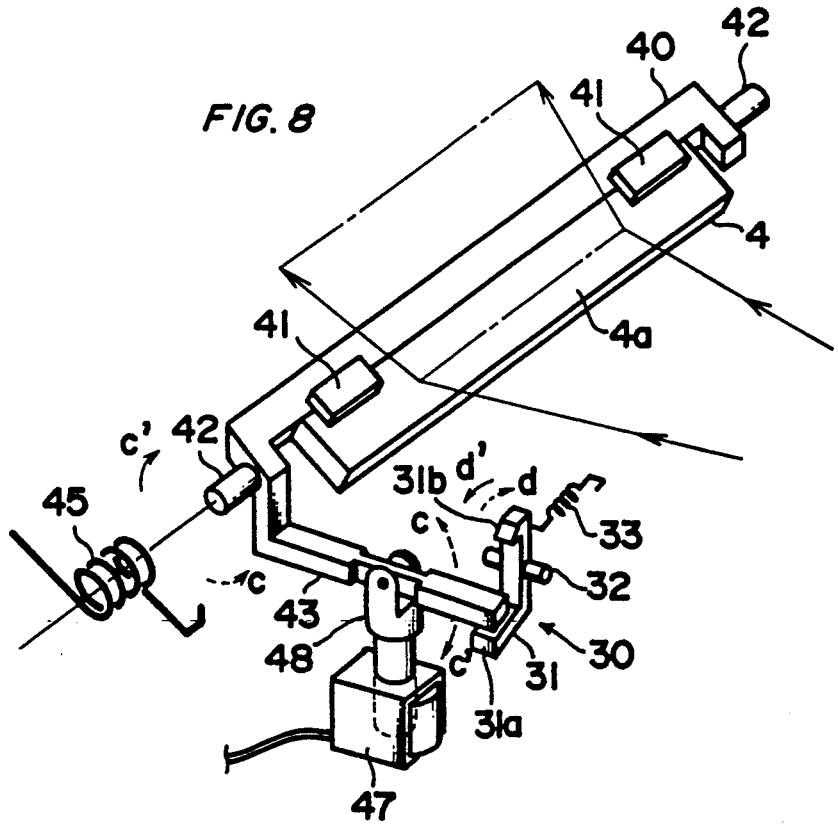

As shown in FIGS. 7 and 8, the mirror 4 with two reflecting surfaces 4a and 4b is nipped and supported by the clicks 41 fixed on the upper and lower surfaces of the holder 40, and the mirror 4 and the holder 40 can turn on the shafts 42 in a body. The mirror 4 can be moved to the first position (the position shown by solid lines in FIGS. 7 and 8) where its front side 4a reflects the laser beam to direct it to the surface of an original on the original glass 1 and the second position (the position shown by dashed lined in FIG. 7) where its reverse side 4b reflects the laser beam to direct it to the photosensitive drum 10.

Specifically, the arm 43 of the holder 40 is connected to a solenoid 47, a pin 49 equipped for a plunger 48 of the solenoid 47 engaging with a guide groove 43a. The holder 40 is also urged in the direction of the arrow c in FIG. 8 by the elasticity of the coil spring 45 which is twisted around one of the shafts 42. The holder 40 is pulled in the direction of the arrow c by the coil spring 45 while the solenoid 47 is off, and when its arm 43 comes into contact with a stopper 39 (refer to FIG. 7), the mirror 4 has been set at the second position. On the other hand, when the solenoid 47 is turned on, the mirror 4 is turned in the direction of the arrow c' together with the holder 40, and when its arm 43 comes into contact with another stopper 38, the mirror 4 has been set at the first position.

Figure 9:
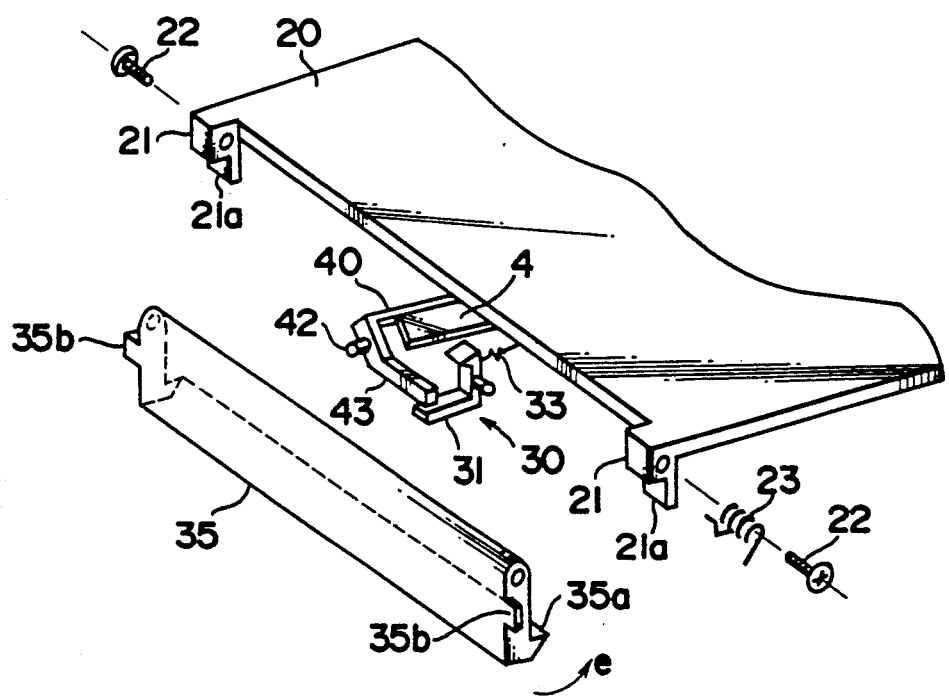
Figure 12:
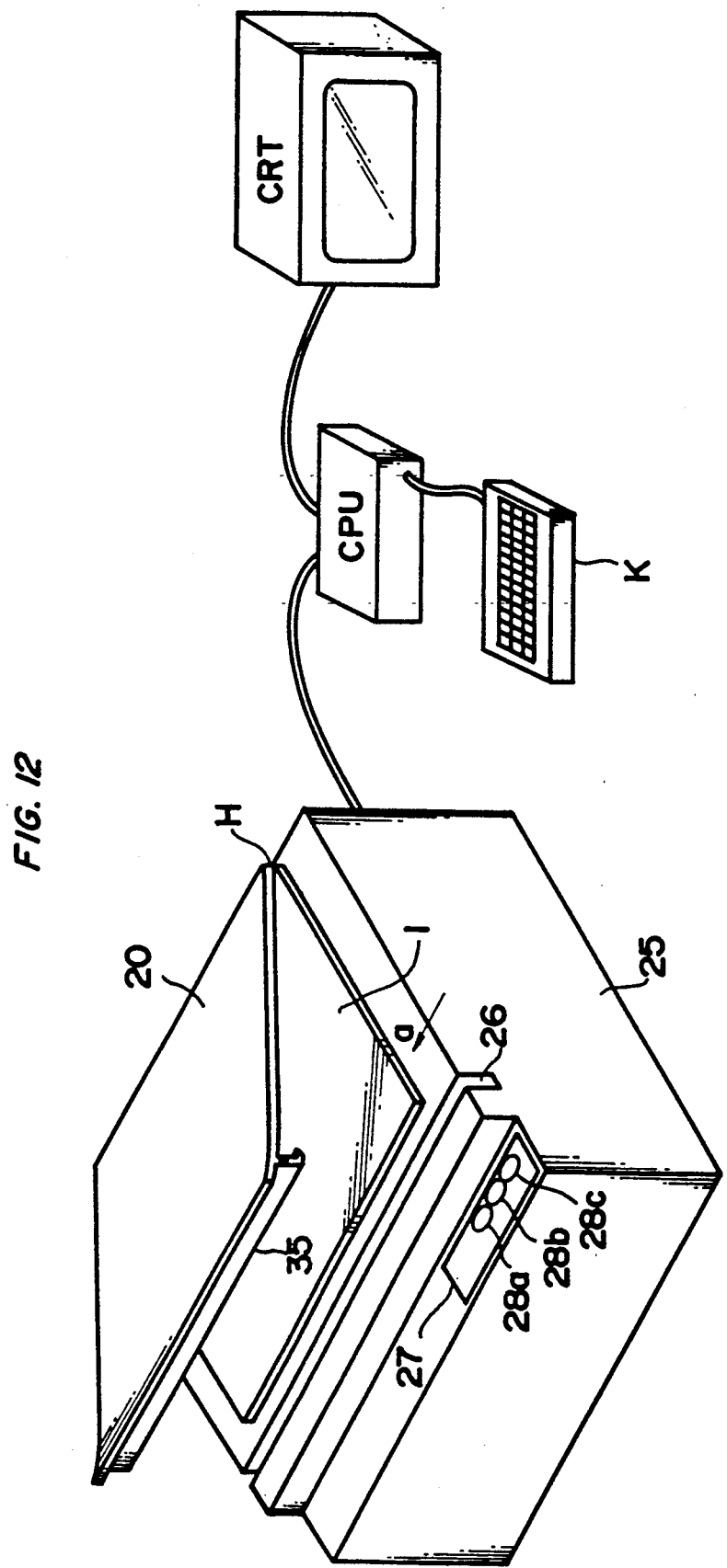

The image forming apparatus of the second embodiment further comprises lock means 30 for preventing the original cover 20 from opening during operation in the copy mode and in the composite mode. The original cover 20 is movable in the direction of the arrow a together with the original glass 1, and as shown in FIG. 12, it can be pushed down and pulled up on the point H to cover and uncover the original glass 1. As shown in FIG. 9, a click receiver 35 is provided in front of the original cover 20 (the free edge of the cover 20), and the click receiver 35 is so disposed to be capable of entering into and retreating from the groove 26. Thus, during operation in the copy mode and the composite mode when there is a fear of exposure of an operator to the laser beam, the click receiver 35 is locked inside the body 25 by a lock lever 31.

Specifically, the lock lever 31 is rotatably provided on the body 25 by a shaft 32 and is urged in the direction of the arrow d by the elasticity of a coil spring 33 at all time. Thus, an edge 31a of the lock lever 30 comes up to touch the arm 43 of the holder 40. A click 31b formed at the upper edge of the lock lever 31 can engage with a click 35a of the click receiver 35 when the original cover 20 is closed.

Figure 10A:
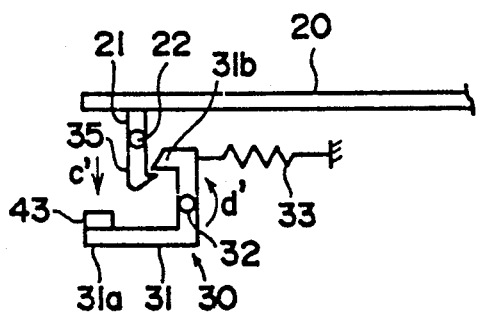
FIGS. 10a, 10b, 11a, 11b and 11c are explanatory views showing how to lock the original cover.
Figure 10B:
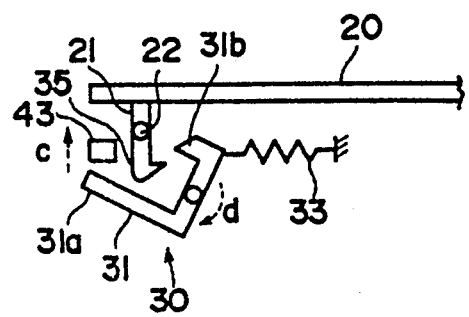

When the apparatus with the above-described constitution is operated in the print mode or is not operated, the solenoid 47 is kept off, and the mirror 4 is kept at the second position. In this moment, the laser beam emitted from the laser diode 2 is reflected on the reverse side 4b of the mirror 4 to be projected on to the photosensitive drum 10. At the same time, the holder 40 is turned in the direction of the arrow c, and the arm 43 is turned upward. Subsequently, the lock lever 31 is turned in the direction of the arrow d, and as shown by FIG. 10b, the click 31b retreats from the position where it engages with the click 35a of the click receiver 35. In this state, the original cover 20 is freely open and closed. Also, there is no fear of exposure of an operator because the laser beam is reflected on the reverse side 4b of the mirror 4.

On the other hand, when the apparatus is to be operated in the copy mode or in the composite mode, the solenoid 47 is turned on. Thereby, the holder 40 is turned in the direction of the arrow c', and the mirror 4 is set at the first position. At this moment, the laser beam is reflected on the front side 4a of the mirror 4 to be directed to an original and then projected on to the photosensitive drum 10. At the same time, the arm 43 of the holder 40 pushes the edge 31a of the lock lever 31 to turn the lock lever 31 in the direction of the arrow d'. Thereby, as shown by FIG. 10a, the click 31b engages with the click 35a of the receiver 35 to lock the original cover 20. Also, in a case of operation in the copy mode or in the composite mode, the original cover 20 is moved in the direction of the arrow a together with the original glass 1. In order to keep the original cover 20 locked during the movement, the click receiver 35 has enough length to comply with the distance of the movement of the original cover 20.

Further, in this second embodiment, a mechanism, which enables the original cover 20 to be closed after the solenoid 47 is turned on to set the lock lever 31 at the position shown in FIG. 10a in response to an opening action of the original cover 20, is provided. That is, as shown in FIG. 9, the click receiver 35 is joined to the original cover 20 at projections 21 on both ends of the cover 20, pins 22 serving as fulcrums. The click receiver 35 is urged in the direction of the arrow e by the elasticity of a coil spring 23, and this elasticity is regulated because tabs 35b formed on both ends of the click receiver 35 are in contact with tabs 21a of the projections 21 respectively.

Figure 11A:
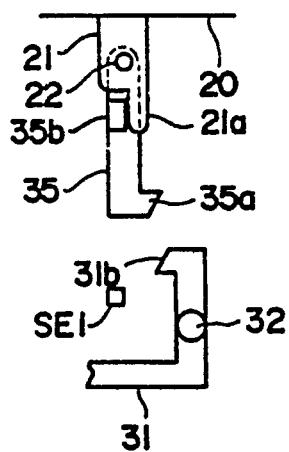
Figure 11B:
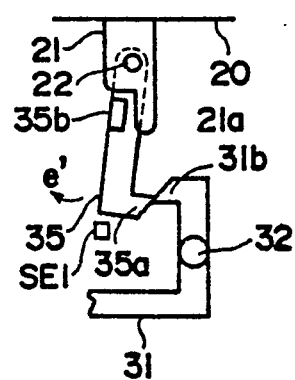

Accordingly, when closing the original cover 20 in a state that the solenoid 47 is turned on, and the lock lever 31 is set at the locking position, as shown in FIGS. 11a and 11b, the click 35a comes into contact with the click 31b of the lock lever 31 and thereby is turned in the direction of the arrow e'. Thereafter, the click 35a is turned back in the direction of the arrow e by the elasticity of the coil spring 23 and passes over the click 31b. Thus, the click 35a engages with the click 31b, so that the original cover 20 is locked.

Figure 11C:
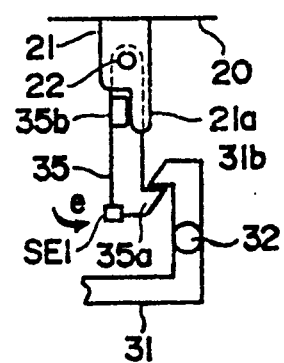

Also, a photosensor SE1 for detecting the original cover 20, which can be opened and closed is installed inside the body 25 (refer to FIGS. 11a, 11b and 11c). The photosensor SE1 detects when the original cover 20 is closed, when the lower edge of the click receiver 35 interrupts the light axis of the photosensor SE1.

The process of forming an image on a paper sheet in the above-described constitution is hereinafter described.

Basically, the image forming process in this second embodiment is similar to the image forming process which was described in conjunction with the first embodiment referring to FIG. 6.

In a case of operation in the print mode so that an image is printed out by the modulated laser beam, the laser beam is reflected on the reverse side 4b of the mirror 4 set at the second position to be projected on to the photosensitive drum 10. On the photosensitive drum 10, as shown by FIG. 6, (a-3), an electrostatic latent image is formed of an imaged portion X remaining charged and a background Y where charge was erased.

In a case of operation in the copy mode so that the image of an original is printed out, the laser beam is reflected on the front side 4a of the mirror 4 to be directed to the surface of the original and then is projected onto the photosensitive drum 10 [refer to FIG. 6, (b-1), (b-2), (b-3)].

Further, in a case of operation in the composite mode, original glass 1 on which an original D is placed is moved at a specified speed, and at the same time, the laser diode 2 is turned on and off to output image data. In this case, the mirror 4 is set at the first position. The images shown by FIG. 6, (c-1) and (c-2) are combined to make a composite image as shown by (c-3).

It is considered preferable from the following points of view that the laser beam is directly projected onto the photosensitive drum 10 during operation in the print mode in comparison with the case that the laser beam is indirectly projected through the reflection of the original cover.

1) The laser beam does not scatter on the original glass 1 and the surface of an original, thereby, the reproduction of dots and the decomposition are improved. In the print mode, since an image is formed of dots, the accurate reproduction of dots largely contributes to a quality image. On the other hand, in the copy mode, the laser beam only needs to function as an illuminator.

2) Since the quantity of light is never reduced on account of the reflection on the surface of an original, a low current and low power laser diode can be used. Accordingly, the laser diode can be so made that it is converted to be driven with a low current in the print mode. Even when the laser diode outputs the same quantity of light in the print mode as that in the copy mode, the laser beam can be adjusted to irradiate the photosensitive drum 10 at the same quantity of light as that in the copy mode by arranging the extinction filter 6 (refer to FIG. 1) in the middle of the light path from the mirror 4 to the photosensitive drum 10.

3) Even if the original cover 20 is pulled open in the middle of operation in the print mode, the laser beam does not leak, and there is no fear of exposure of an operator. Accordingly, an original to be copied after the operation in the print mode can be placed on the original glass 1 beforehand. Also, in this second embodiment, when the apparatus is not in operation, the mirror 4 is kept at the second position. Thereby, even if the laser diode 2 emits a light by mistake, the laser beam never irradiates the original glass 1, which will protect an operator from an unexpected exposure.

As mentioned in the description of the first embodiment, the diameter of the laser beam irradiating the surface of an original needs to be narrow enough so that the image of the original can be well reproduced.

On the other hand, while the laser beam scans an original, that is, while there is a fear of exposure of an operator to the laser beam irradiating the original glass 1, the lock means 30 is operated in response to the motion of the mirror 4 to lock the original cover 20 with the lock lever 31. Thereby, the fear of exposure of an operator can be surely eliminated.

The apparatus as a whole is constituted as shown in FIG. 12. The main body 25 of the image forming apparatus is connected to a host computer CPU which is operated with a keyboard K, and the host computer CPU is connected to a display device CRT.

Figure 13:
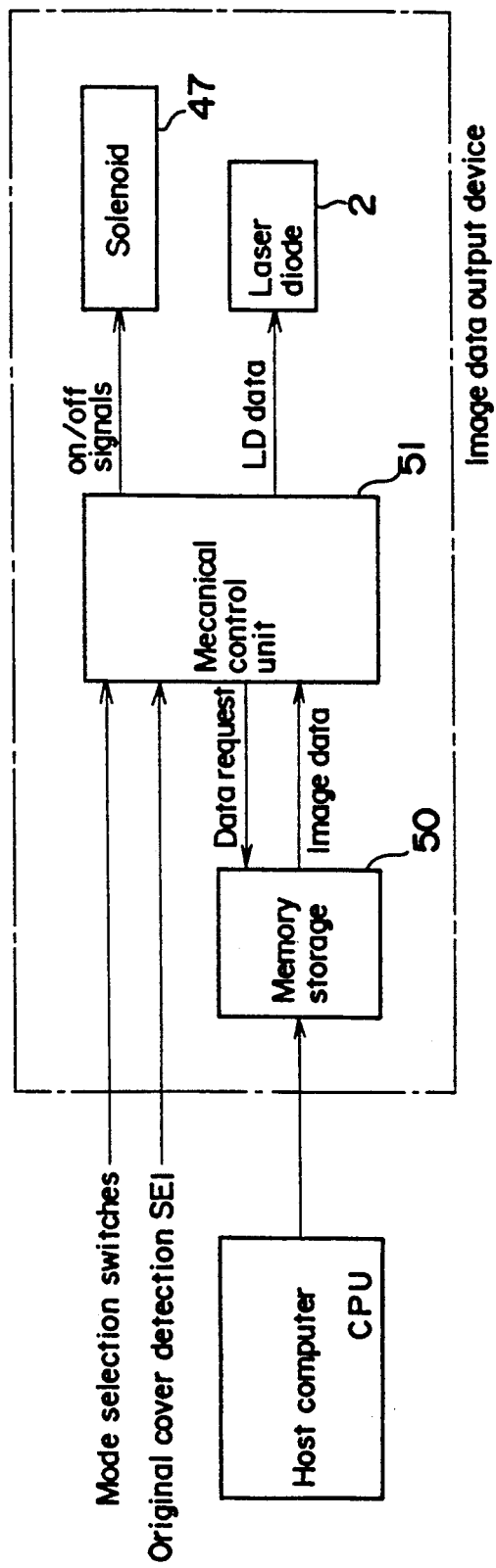

The host computer CPU is connected to a memory storage 50 of an image data output device (refer to FIG. 13). The memory storage 50 outputs image data in response to a data requiring signal from a mechanical control unit 51, and the laser diode 2 is controlled in accordance with the image data. The mechanical control unit 51 also turns on and off the solenoid 47 which moves the mirror 4.

A copy mode selection switch 28a, a print mode selection switch 28b and a composite mode selection switch 28c are provided on a control panel of the body 25, and each mode is selected when a corresponding switch is turned on. Signals produced from these switches 28a, 28b, 28c and the photosensor SE1 for detecting the original cover 20 be open and closed are input into the mechanical control unit 51 so that the mechanism control section 51 can perform necessary control.

A control procedure of forming an image in accordance with the control circuitry shown by FIG. 13 is hereinafter described referring to flowcharts in FIGS. 14 and 15.

Figure 14:
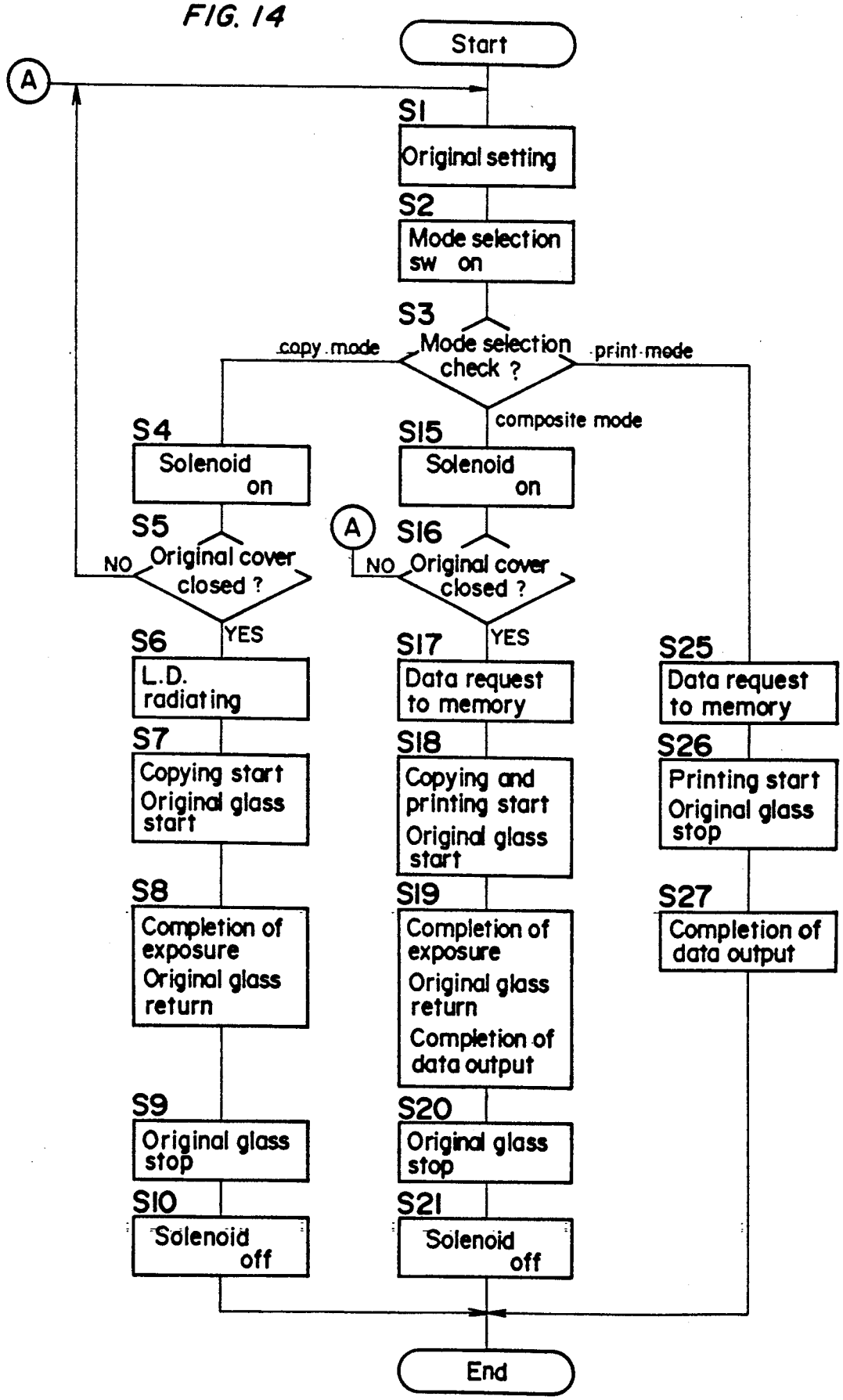

FIG. 14 shows an example of the control procedure.

First, at step S1, an original is placed on the original glass 1. In a case of operation in the print mode, the processing at step S1 is not executed.

Next, one of the mode selection switches 28a, 28b and 28c is turned on at step S2. In this embodiment, a signal informing that one of the switches has been turned on is also used as a print start signal to operate the body 25. Subsequently, at step S3, it is checked which mode was selected. When the print mode was selected, the processing goes to step S25 to request the memory storage 50 for data, and printing is started at step S26. In this case, the original glass 1 is kept at a stop position. At step S27, the printing is completed in synchronization with the completion of the data output. In a case of operation in the print mode, the solenoid 47 is kept off, the mirror 4 is kept at the second position, and the laser beam never irradiates the original glass 1.

On the other hand, when the copy mode or the composite mode was selected, in both cases, first, the solenoid 47 is turned on at step S4 and S15 respectively. Thereby, the mirror 4 is converted to the first position, so that the laser beam can irradiate the original glass 1. At the same time, the lock lever 31 engages with the click receiver 35 to lock the original cover 20. It is confirmed at step S5 and S16 respectively, based on a signal sent from the photosensor SE1, that the original cover 20 is closed, and thereafter processing in the copy mode and the composite mode are executed respectively.

In the copy mode, the laser diode 2 is forced to emit a light at step S6, and copying is started at step S7. In this case, the original glass 1 is moved. At step S8, the original glass 1 is returned to its initial position when its motion for exposure is completed, and the original glass 1 is stopped from moving at step S9. In a case of a multiple copying operation, the above-described process is repeated, and when the copying operation is completed, the solenoid 47 is turned off at step S10 to enable the original to be replaced with another.

In the composite mode, the mechanical control unit 51 requests the image data to the memory storage 50 at step 17, and the processing to be executed at step 18 and so on is similar to the above-mentioned copy mode.

Figure 15:
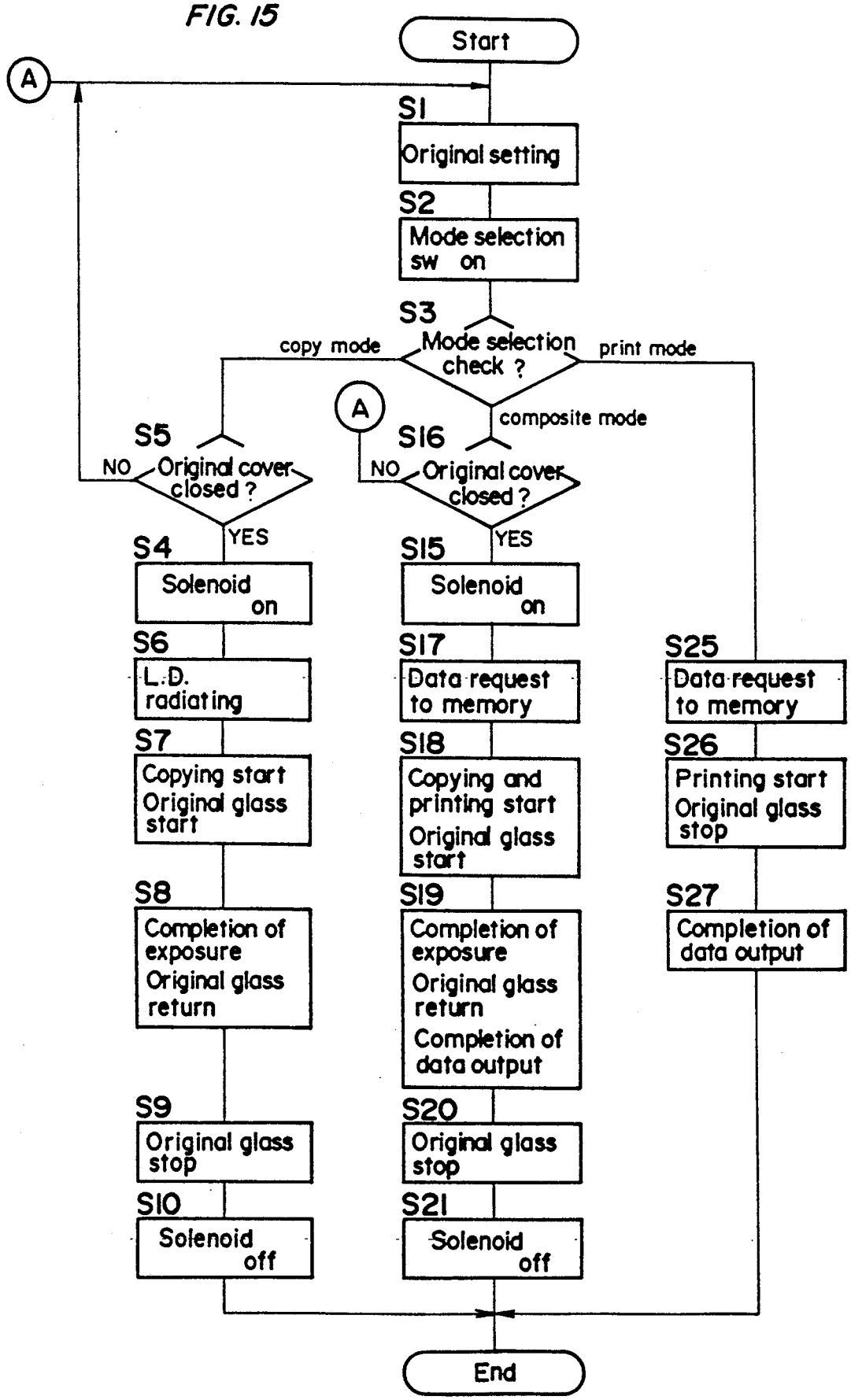

FIG. 15 shows another example of the control procedure.

Here, basically the same processing as shown by FIG. 14 is executed. When the check of mode selection at step S3 results in the copy mode or the composite mode, it is confirmed correspondingly at step S5 or at step S16 based on the signal from the photosensor SE1 that the original cover 20 is closed, and thereafter the solenoid 47 is turned on at step S4 or at step S15 to move the mirror 4 to the first position. Thus, the original cover 20 is checked whether open or closed before the solenoid 47 is turned on, so that the mechanism as shown by FIGS. 9, 11a, 11b and 11c, which enables the click receiver 35 to retreat in the direction of the arrow e' and engage with the lock lever 31a, can be omitted.

On the other hand, in this second embodiment, a pulse motor can be used as means for setting the mirror 4 to the second position instead of the solenoid 47. Here the mode selection switches 28a, 28b and 28c also work to start printing, but it is possible that a print switch is provided on the control panel 27 so that the timing of starting printing can be arbitrarily input. Furthermore, in this embodiment, as a means of scanning the image of an original, a moving original glass type has been adopted, but the optical system can be so made to be movable instead.

Although the present invention has been described in connection with the preferred embodiment thereof, it is to be noted that various changes and modifications are apparent to those who are skilled in the art. Such changes and modifications are to be understood as included within the scope of the present invention as defined by the appended claims, unless they depart therefrom.

What is claimed is:

1. An image forming apparatus, comprising:
   an original glass for supporting an original, said original glass being provided with an openable original cover;
   a rotatable photosensitive member;
   laser beam radiating means including a radiant element for radiating a laser beam and a scanning device for scanning the laser beam in a first direction;
   control means for turning on and off said radiant element to radiate a laser beam in accordance with image data;
   guiding means for guiding the laser beam radiated from said laser beam radiating means to either said original glass or alternatively to only said photosensitive member;
   optical means for projecting an image reflected from an original onto said photosensitive member; and
   scanning means for relatively scanning the reflected image in a second direction perpendicular to the first direction.

2. An image forming apparatus as claimed in claim 1, further comprising:
   mode selection means for selecting a print mode that an image results from turning on and off the laser beam, a copy mode that a copy of an original results from exposure of said photosensitive member to the laser beam reflected from the surface of an original or a composite mode that a composite image is formed of a copy of an original and an image resulting from turning on and off the laser beam;
   lock means for locking said original cover; and
   drive means for driving said lock means to lock said original cover when said copy mode or said composite mode is selected.

3. An image forming apparatus as claimed in claim 2, wherein said drive means causes said lock mean to unlock said original cover when said print mode is selected.

4. An image forming apparatus as claimed in claim 1, further comprising:
   lock means for locking said original cover; and
   drive means for driving said lock means to lock said original cover when said optical means guides the laser beam to said original glass.

5. An image forming apparatus as claimed in claim 1, wherein said guiding means includes a reflecting means for guiding the laser beam radiated from said laser beam radiating means to said photosensitive member, said reflecting means being movable between a first position in which the laser beam radiated from said laser beam radiating means is guided to said original glass and a second position in which the laser beam radiated from said laser beam radiating means is guided to said photosensitive member.

6. An image forming apparatus as claimed in claim 5, wherein said reflecting means is moved from the first position to the second position when said original cover is open.

7. An image forming apparatus as claimed in claim 1, wherein said guiding means includes reflecting means movable between a first position in which the laser beam, radiated from said laser beam radiating means, is guided to said original glass and a second position in which the laser beam radiated from said laser beam radiating means is guided to said photosensitive member.

8. An image forming apparatus as claimed in claim 1 further including operator control means for permitting an operator to select one of a copy mode and a print mode and correspondingly direct the guiding means in accordance with the mode selected to scan the original with the laser beam in a copy mode and to directly contact the photosensitive member with the laser beam in a print mode.

9. An image forming apparatus, comprising:
   an original glass for supporting an original, said original glass being provided with an openable original cover;
   a rotatable photosensitive member;
   laser beam radiating means including a radiant element for radiating a laser beam and a scanning device for scanning the laser beam in a first direction;
   control means for turning on and off said radiant element to radiate a laser beam in accordance with image data;
   guiding means for guiding the laser beam radiated from said laser beam radiating means to either said original glass or said photosensitive member;
   optical means for projecting an image reflected from an original onto said photosensitive member;
   scanning means for relatively scanning the reflected image in a second direction perpendicular to the first direction; and
   drive means for driving said guiding means to direct the laser beam to said photosensitive member when said original cover is open.

10. An image forming apparatus as claimed in claim 9, wherein said drive means is a mechanism which drives said guiding means to direct the laser beam to said photosensitive member in connection with an opening action of said original cover.

11. An image forming apparatus as claimed in claim 9, wherein said drive means includes detection means for detecting said original cover be open and closed and a mechanism which drives said guiding means to direct the laser beam radiated from said laser beam radiating means to said photosensitive member in response to an original cover open signal generated from said detection means.

12. An image forming apparatus, comprising:
   an original glass for supporting an original, said original glass being provided with an openable original cover;
   a rotatable photosensitive member;
   laser beam radiating means including a radiant element for radiating a laser beam and a scanning device for scanning the laser beam in a first direction;
   control means for turning on and off said radiant element to radiate a laser beam in accordance with image data;
   guiding means for guiding the laser beam radiated from said laser beam radiating means to either said original glass or said photosensitive member;
   optical means for projecting an image reflected from an original onto said photosensitive member;
   scanning means for relatively scanning the reflected image in a second direction perpendicular to the first direction;

mode selection means for selecting a print mode that an image results from turning on and off the laser beam, a copy mode that a copy of an original results from exposure of said photosensitive member to the laser beam reflected from the surface of an original or a composite mode that a composite image is formed of a copy of an original and an image resulting from turning on and off the laser beam; and drive means for driving said guiding means to direct the laser beam to said photosensitive member when said print mode is selected.

13. An image forming apparatus having a copying and printing capability, comprising:

means for generating a laser beam;

means, responsive to the impact of a laser beam, for recording an image realized by the laser beam, including a recording member having a surface responsive to the laser beam;

means for scanning the laser beam across the surface of the recording means;

means for supporting an original for a copying mode of operation;

means for scanning the original with the laser beam to provide a copy image for the recording means;

means for receiving input data to control the laser beam to provide a printing image for the recording means;

means for providing paper for both a printing and copying mode of operation to receive and fix any indicia image information on the recording member;

control means, responsive to an operator, for selecting one of a copy mode and a print mode for directing a specific mode of operation of the laser beam, and means for varying the direction of the laser beam depending on the specific mode of operation set by the control means.

14. The image forming apparatus of claim 13 further including a lockable cover member for separating an operator from the means for supporting an original.

15. The image forming apparatus of claim 14 further including means for releasably locking the cover in a copy mode of operation.

16. The image forming apparatus of claim 13 wherein the means for varying includes a movable mirror that can direct the laser beam towards either the means for support or towards the recording member.

* * * * *